S. G. HARDY.
CLUTCH.
APPLICATION FILED MAR. 20, 1914.
1,163,085.
Patented Dec. 7, 1915.
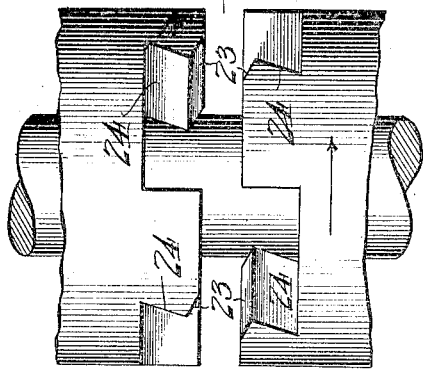
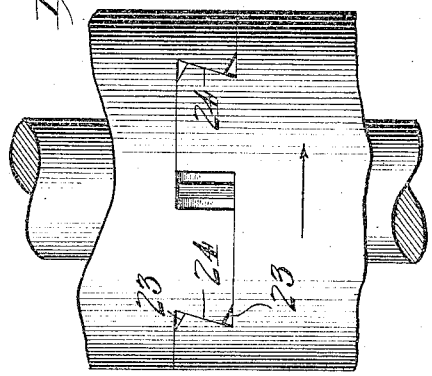
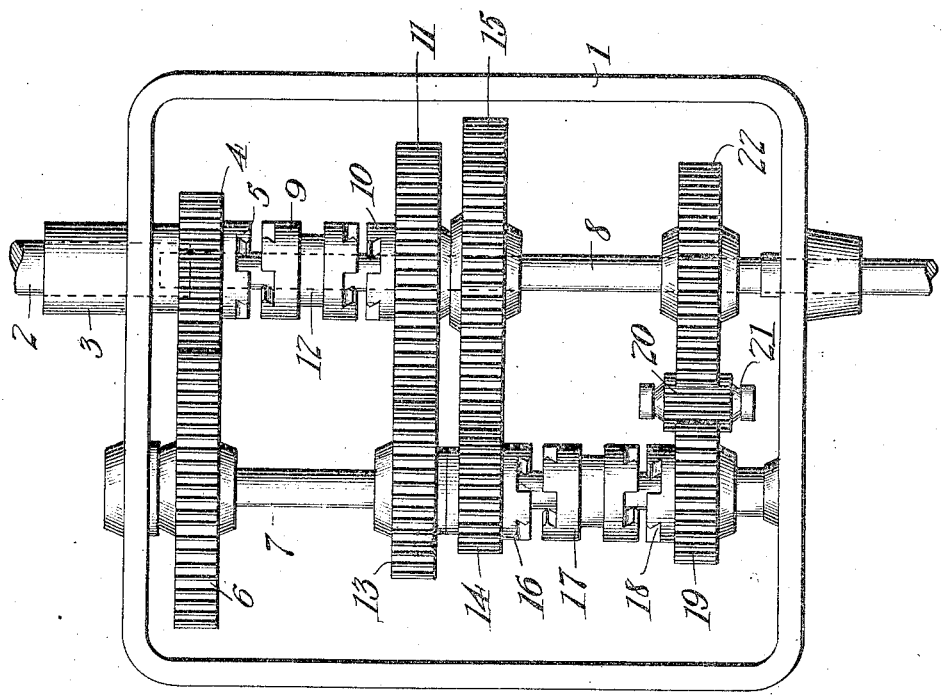
Inventor
Soula G. Hardy

UNITED STATES PATENT OFFICE.

SOULA G. HARDY, OF RIPLEY, OKLAHOMA, ASSIGNOR OF ONE-HALF TO Q. V. BRIDWELL, OF RIPLEY, OKLAHOMA.

CLUTCH.

1,163,085.  Specification of Letters Patent.  Patented Dec. 7, 1915.

Application filed March 20, 1914. Serial No. 826,037.

*To all whom it may concern:*

Be it known that I, SOULA G. HARDY, a citizen of the United States, residing at Ripley, in the county of Payne and State of Oklahoma, have invented certain new and useful Improvements in Clutches, of which the following is a specification.

This invention relates to variable speed mechanisms, and is particularly designed for use in connection with automobile transmission.

The object of the invention is to provide a gearing of this class that is cheap and simple of construction, and which may be operated without danger of "chipping" or "stripping" the gears when changing speeds while in operation.

With this and other objects in view, the invention consists of a plurality of gears mounted upon a driving shaft and a countershaft, certain of said gears being fast to the shaft and others free, except when engaged by sliding clutch members, said members being formed with teeth of a novel formation whereby it is possible to bring into and out of action certain of said gears without damage to their toothed faces.

In the drawings forming a part of this application, Figure 1 is a plan view of the improved variable speed gearing. Fig. 2 is a view of a portion of the clutch member, disengaged. Fig. 3 is a view of the same engaged.

It is a well known fact that in older types of selective variable speed gearing the countershaft driving gear and its driver seldom wear out or become broken, but by reason of the sliding into and out of engagement of the different gears to obtain different speeds, there results a chipping away of the ends of the teeth of the gears so that they quickly become useless. In many instances when changing from one speed to another, the gears are often "stripped" rendering the mechanism useless.

In carrying out my invention I may provide the usual casing or housing 1, in which suitable bearings may be provided for the shafts. One of these shafts designated in the drawings at 2 rotates in the bearing 3, and the end of said shaft which extends within the housing has keyed thereon a driving gear 4. This gear is formed upon one of its sides with a plurality of teeth 5, these teeth forming part of a clutch hereinafter described. The gear 4 engages another gear 6 of larger diameter fixed to a countershaft 7 whereby said shaft may be driven.

The shaft 2 extends only a short distance within the housing and has its end bored longitudinally to receive the end of a shaft 8 of smaller diameter. Any suitable means may be employed to form an anti-friction bearing for the shaft 8 at this point. Splined upon this shaft 8 is a sliding clutch member 9 having a plurality of teeth upon each of its faces, one of said faces being adapted to engage the teeth 5 while the opposite face is adapted to engage teeth 10 formed upon one side of a gear 11 loosely mounted upon the shaft 8. The clutch member 9 is preferably provided with a groove 12 for engagement with the usual shifting yoke (not shown).

The gear 11 engages a gear 13, preferably of smaller diameter, said gear being fixed to the countershaft 7. A gear 14 loosely mounted on the countershaft 7 engages a gear 15 of larger diameter fixed upon the shaft 8. This gear 14 is provided with clutch teeth 16 adapted to engage the teeth of a clutch member 17 similar to the member 9, this member 17 being splined to the countershaft 7. The opposite face of the clutch member 17 is adapted to engage teeth 18 formed on a pinion 19 loose upon the countershaft 7, and said pinion engages a pinion 20 mounted on a short shaft 21, this last mentioned pinion engaging a gear 22 fixed upon the shaft 8.

It will thus be seen that the shaft 2 which is the power shaft carries with it the gear 4, and by bringing into engagement the member 9 with the teeth 5 the shafts 2 and 8 are coupled and a direct drive is obtained. If the member 9 is thrown into engagement with the teeth 10, an intermediate speed is obtained through the gears 4, 6, 13 and 11. By sliding the member 17 into engagement with the teeth 16, a low speed results through the gears 4, 6, 14 and 15, while a reverse motion of the shaft 8 is obtained by sliding the member 17 into engagement with the teeth 18. This brings into action the gears 4, 6, 19, 20 and 22.

The clutch members 9 and 17, as well as the teeth 5, 10, 16 and 18 as before stated are of novel formation. By reference to Figs. 2 and 3 it will be seen that the opposite teeth of the clutches are provided with chamfered corners 23, and inclined faces 24, these inclined faces being at approximately 90° to the chamfer 23.

By reason of the chamfered corners of the teeth engagement is absolutely prevented until both members are rotating at approximately the same speed. The chamfered tooth presents to the incoming tooth which is also chamfered a reverse inclined plane with the result that nothing more than a glancing off of the incoming member is obtained until both are rotating at approximately the same speed. After the engagement is partially made, the inclined face 24 automatically assists the further engagement and locks the teeth firmly together.

It will be apparent from the foregoing that I have provided a simple and effective variable speed gearing which does away with the necessity of sliding gears and thereby eliminates the possibility of "stripping" when changing speeds with the mechanism running.

Changes in the form, proportion and minor details of construction may be resorted to without departing from the spirit or sacrificing any of the advantages of the invention.

What I claim is:—

A clutch provided with oppositely disposed engaging teeth, the initial engaging portions of said teeth being chamfered, and oppositely inclined locking surfaces formed on said teeth.

In testimony whereof I affix my signature in presence of two witnesses.

SOULA G. HARDY.

Witnesses:
 CARLTON C. RADABAUGH,
 JOHN C. DEJARNETT.